(12) United States Patent
Nowak

(10) Patent No.: US 11,158,345 B2
(45) Date of Patent: Oct. 26, 2021

(54) CONTROLLING CAPTURE OF CONTENT USING ONE OR MORE CLIENT ELECTRONIC DEVICES

(71) Applicant: Benjamin Nowak, Atlanta, GA (US)

(72) Inventor: Benjamin Nowak, Atlanta, GA (US)

(*) Notice: Subject to any disclaimer, the term of this patent is extended or adjusted under 35 U.S.C. 154(b) by 0 days.

(21) Appl. No.: 14/883,262

(22) Filed: Oct. 14, 2015

(65) Prior Publication Data

US 2016/0112649 A1 Apr. 21, 2016

Related U.S. Application Data

(60) Provisional application No. 62/064,464, filed on Oct. 15, 2014.

(51) Int. Cl.

| *G11B 27/031* | (2006.01) |
| *H04W 4/80* | (2018.01) |
| *H04N 5/77* | (2006.01) |
| *H04N 5/232* | (2006.01) |
| *G11B 27/10* | (2006.01) |

(Continued)

(52) U.S. Cl.
CPC ............ *G11B 27/031* (2013.01); *G11B 27/10* (2013.01); *H04N 5/23206* (2013.01); *H04N 5/23238* (2013.01); *H04N 5/23293* (2013.01); *H04N 5/247* (2013.01); *H04N 5/265* (2013.01);

(Continued)

(58) Field of Classification Search
CPC ........ G11B 27/031; G11B 27/10; H04N 5/77; H04N 5/247; H04N 5/23206; H04N 5/265; H04N 9/87; H04N 5/23238; H04W 4/008
See application file for complete search history.

(56) References Cited

U.S. PATENT DOCUMENTS

| 6,208,376 B1 | 3/2001 | Tanaka et al. |
| 6,342,900 B1 | 1/2002 | Ejima et al. |

(Continued)

FOREIGN PATENT DOCUMENTS

| CA | 2298958 A1 | 1/2001 |
| EP | 1998567 A1 | 12/2008 |

(Continued)

OTHER PUBLICATIONS

Copending U.S. Appl. No. 16/517,104, filed Jul. 19, 2019 entitled "Systems and Methods for Multiple Device Control and Content Curation".

(Continued)

*Primary Examiner* — Joseph Suh
(74) *Attorney, Agent, or Firm* — Bekiares Eliezer LLP

(57) ABSTRACT

A master electronic device is provided. The master electronic device is configured to control capture of content using one or more client electronic devices. The master electronic device may include a user interface module configured to receive an indication of a control-input. Further, the master electronic device may include a communication module configured to communicate data between the master electronic device and one or more client electronic devices. The communication may include wireless transmission of the control-input to the one or more client electronic devices. Additionally, the one or more client electronic devices may include a means to capture content in response to the control-input. The means to capture content may be activated in response to the received control-input.

11 Claims, 12 Drawing Sheets

(51) Int. Cl.
    *H04N 5/247*   (2006.01)
    *H04N 9/87*    (2006.01)
    *H04N 5/265*   (2006.01)
(52) U.S. Cl.
    CPC ............... *H04N 5/77* (2013.01); *H04N 9/87*
                       (2013.01); *H04W 4/80* (2018.02)

(56) References Cited

U.S. PATENT DOCUMENTS

| | | | |
|---|---|---|---|
| 8,660,965 B1 | 2/2014 | Bickerstaff | |
| 8,717,422 B2* | 5/2014 | Hewes | H04N 13/167 348/47 |
| 8,813,154 B1 | 8/2014 | Sivertsen | |
| 9,704,531 B2 | 7/2017 | Nowak | |
| 10,362,075 B2 | 7/2019 | Nowak | |
| 10,771,518 B2 | 9/2020 | Nowak | |
| 2003/0113096 A1 | 6/2003 | Taira et al. | |
| 2004/0096185 A1* | 5/2004 | Takeuchi | H04N 5/76 386/349 |
| 2006/0010199 A1* | 1/2006 | Brailean | H04L 67/125 709/204 |
| 2006/0022954 A1* | 2/2006 | Berry | G06F 1/1637 345/173 |
| 2006/0033954 A1* | 2/2006 | Kamijima | H04N 1/32128 358/1.15 |
| 2007/0117083 A1* | 5/2007 | Winneg | G09B 7/00 434/350 |
| 2007/0187183 A1 | 8/2007 | Saigh et al. | |
| 2008/0052371 A1* | 2/2008 | Partovi | H04L 67/306 709/217 |
| 2008/0143875 A1* | 6/2008 | Scott | H04N 21/472 348/512 |
| 2008/0210880 A1* | 9/2008 | Baroni | G01T 3/001 250/390.11 |
| 2009/0089322 A1* | 4/2009 | Naaman | G06F 16/48 |
| 2009/0096871 A1* | 4/2009 | Kuwano | G06T 7/20 348/169 |
| 2010/0272102 A1* | 10/2010 | Kobayashi | H04N 21/4305 370/389 |
| 2011/0030016 A1* | 2/2011 | Pino, Jr. | H04N 21/6131 725/80 |
| 2012/0319997 A1* | 12/2012 | Majumder | H04N 9/3147 345/175 |
| 2013/0003757 A1* | 1/2013 | Boatright | H04N 21/242 370/474 |
| 2013/0024299 A1 | 1/2013 | Wong et al. | |
| 2013/0209059 A1* | 8/2013 | Scheele | G11B 27/10 386/230 |
| 2013/0216155 A1* | 8/2013 | Lim | G06T 3/40 382/284 |
| 2013/0225067 A1* | 8/2013 | Card | H04L 25/20 455/7 |
| 2013/0259446 A1* | 10/2013 | Sathish | G11B 27/034 386/278 |
| 2013/0272186 A1* | 10/2013 | Mohanty | H04J 11/00 370/312 |
| 2013/0300933 A1* | 11/2013 | Thorson | H04N 21/4307 348/500 |
| 2014/0180615 A1 | 6/2014 | Simon | |
| 2014/0186004 A1* | 7/2014 | Hamer | G11B 27/10 386/223 |
| 2014/0223463 A1* | 8/2014 | Hatambeiki | H04N 21/4852 725/12 |
| 2014/0240469 A1* | 8/2014 | Lee | H04N 13/25 348/48 |
| 2014/0253722 A1* | 9/2014 | Smyth | H04N 5/23296 348/135 |
| 2014/0297717 A1* | 10/2014 | Grossman | H04L 67/10 709/203 |
| 2014/0307167 A1 | 10/2014 | Zehler et al. | |
| 2014/0328578 A1* | 11/2014 | Shafron | H04N 21/63 386/328 |
| 2014/0355947 A1* | 12/2014 | Slamecka | H04N 5/91 386/201 |
| 2014/0355951 A1* | 12/2014 | Tabak | H04N 9/8205 386/241 |
| 2015/0049192 A1* | 2/2015 | Hooton | B60R 1/00 348/148 |
| 2015/0143239 A1* | 5/2015 | Birkbeck | H04N 21/8456 715/716 |
| 2016/0019526 A1 | 1/2016 | Granbery et al. | |
| 2016/0026161 A1* | 1/2016 | Marutani | G05B 11/01 307/112 |
| 2016/0077422 A1* | 3/2016 | Wang | H04N 5/23222 348/38 |
| 2016/0094773 A1* | 3/2016 | Maciuca | H04N 5/23222 348/207.11 |
| 2016/0097861 A1 | 4/2016 | Li et al. | |
| 2016/0111128 A1 | 4/2016 | Nowak | |
| 2016/0171596 A1* | 6/2016 | Angerbauer | A61B 3/0033 705/27.2 |
| 2016/0180884 A1* | 6/2016 | Nowak | H04N 9/8205 386/201 |
| 2016/0182849 A1* | 6/2016 | Wakao | H04N 7/18 348/333.04 |
| 2016/0244311 A1 | 8/2016 | Burks et al. | |
| 2016/0283922 A1* | 9/2016 | Jinno | G06Q 20/105 |
| 2016/0311442 A1 | 10/2016 | Shin et al. | |
| 2017/0111413 A1* | 4/2017 | Nowak | H04L 65/60 |
| 2019/0037251 A1* | 1/2019 | Tsukagoshi | H04N 21/2387 |
| 2019/0342353 A1 | 11/2019 | Nowak | |
| 2021/0067572 A1 | 3/2021 | Nowak | |

FOREIGN PATENT DOCUMENTS

| | | |
|---|---|---|
| JP | 9289636 A | 11/1997 |
| JP | 11341443 A | 12/1999 |
| JP | 2004140797 A | 5/2004 |
| JP | 2006108790 A | 4/2006 |
| JP | 2006140559 A1 | 6/2006 |
| JP | 2007282279 A | 10/2007 |
| JP | 2008278237 A | 11/2008 |
| JP | 2011049857 A | 3/2011 |
| JP | 2014011633 A | 1/2014 |
| WO | 2011060809 A1 | 5/2011 |
| WO | WO 2014/093668 | 6/2014 |
| WO | 2016061261 A1 | 4/2016 |

OTHER PUBLICATIONS

International Search Report and Written Opinion dated Feb. 1, 2016 cited in Application No. PCT/US2015/055580 8 pgs.
U.S. Non-Final Office Action dated Dec. 14, 2016 cited in U.S. Appl. No. 14/883,303, 7 pgs.
International Preliminary Report on Patentability and Written Opinion dated Apr. 18, 2017 Application No. PCT/US2015/055580, 6 pgs.
European Search Report dated May 30, 2018 cited in Application No. 15849969.9, 8 pgs.
U.S. Non-Final Office Action dated Jul. 18, 2018 cited in U.S. Appl. No. 15/049,669, 12 pgs.
Japanese Notice of Reasons for Refusal dated Mar. 26, 2019 cited in Application No. 2017-521154, 5 pgs.
Chinese First Office Action dated Feb. 1, 2019 cited in Application No. 201580063297.9, 11 pgs.
Chinese Second Office Action dated Sep. 11, 2019 cited in Application No. 201580063297.9, 11 pgs.
European Communication dated Feb. 14, 2020 cited in Application No. 15849969.9, 10 pgs.
Japanese Decision of Refusal dated Mar. 3, 2020 cited in Application No. 2017-521154, 15 pgs.
Israeli First Office Action dated Oct. 28, 2019 cited in Application No. 251691, 14 pgs.
European Second Examination Report dated May 11, 2021 cited in Application No. 15849969.9, 12 pgs.

* cited by examiner

CONTROLLING CAPTURE OF CONTENT USING ONE OR MORE CLIENT ELECTRONIC DEVICES

RELATED APPLICATIONS

Under the provisions of 35 U.S.C. § 119(e), this application claims priority from U.S. provisional patent application No. 62/064,464, filed on Oct. 15, 2014 which is incorporated herein by reference in its entirety.

Related U.S. patent application Ser. No. 14/883,303 filed on even date herewith in the name of the present inventor and entitled "CREATING COMPOSITION OF CONTENT CAPTURED USING PLURALITY OF ELECTRONIC DEVICES," is hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF THE INVENTION

Generally, the disclosure relates to electronic devices. More specifically, the disclosure relates to methods, systems and devices or controlling capture of content using one or more client electronic devices.

BACKGROUND

There are several situations where content needs to be captured using two or more content capturing devices. For example, in film production, it is common to use a multiple camera setup for capturing visual content of a scene. The multiple camera setup includes two or more cameras positioned at different spatial coordinates. Accordingly, the scene may be recorded from two or more different viewpoints.

Such multi-camera systems often require a substantial level of technical expertise, director supervision, and a significant amount of post-production editing.

For example, in order to produce a final composition of content captured using the two or more content capturing devices, complex post-production editing is generally required. Videos obtained from the two or more cameras in the multiple camera setup may be subjected to synchronization and stitching under supervision of a human editor. As a result, a final video including visual content captured from different viewpoints may be obtained. This process of stitching is complex, time consuming and burdensome. Moreover, processing content captured using two or more content capturing devices involves the use of complex processing tools. For example, postproduction editing of the videos obtained from the multiple camera setup require complex and expensive video processing software.

Accordingly, there is a need for improved methods, systems and devices for capturing content using two or more content capturing devices.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Disclosed is a master electronic device configured to control capture of content using one or more client electronic devices. The master electronic device may include a user interface module configured to receive an indication of a control-input. Further, the master electronic device may include a communication module configured to communicate data between the master electronic device and one or more client electronic devices. The communication may include wireless transmission of the control-input to the one or more client electronic devices. Further, the at least one client electronic device may include a means to capture content in response to the control-input. Accordingly, the means to capture content may be activated in response to the received control-input.

Further disclosed is a client electronic device configured to control capture of content. The client electronic device may include a communication module configured to communicate data between the client electronic device and a master electronic device. The communication may include wireless reception of a control-input. Further, the client electronic device may include a means to capture content in response to the control-input. Accordingly, the means to capture content may be activated in response to the received control-input.

Also disclosed is a method of controlling capture of content using one or more client electronic devices. The method may include receiving an indication of a control-input at a master electronic device. Further, the method may include communicating data between the master electronic device and one or more client electronic devices. The communicating may include wirelessly transmitting the control-input to the one or more client electronic devices. Additionally, the method may include capturing content in response to the control-input.

Further, in various embodiments, the control-input may include a time value. The time value may correspond to one or more of initiation of capture of the content, pausation of capture of the content and termination of capture of the content. Additionally, a client timing module included in the one or more client electronic devices may be configured to be synchronized with a master timing module included in the master electronic device. Further, the synchronization may be based on the time value. Accordingly, in various embodiments, each of the one or more client electronic devices may be configured to capture content synchronously. Further, in another embodiment, each of the master electronic device and the one or more client electronic devices may be configured to capture content synchronously in response to the control-input.

In yet another embodiment, the control-input may include an indication of one or more operations. Further, the one or more client electronic devices may be configured to perform the one or more operations at a time indicated in the time value. Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
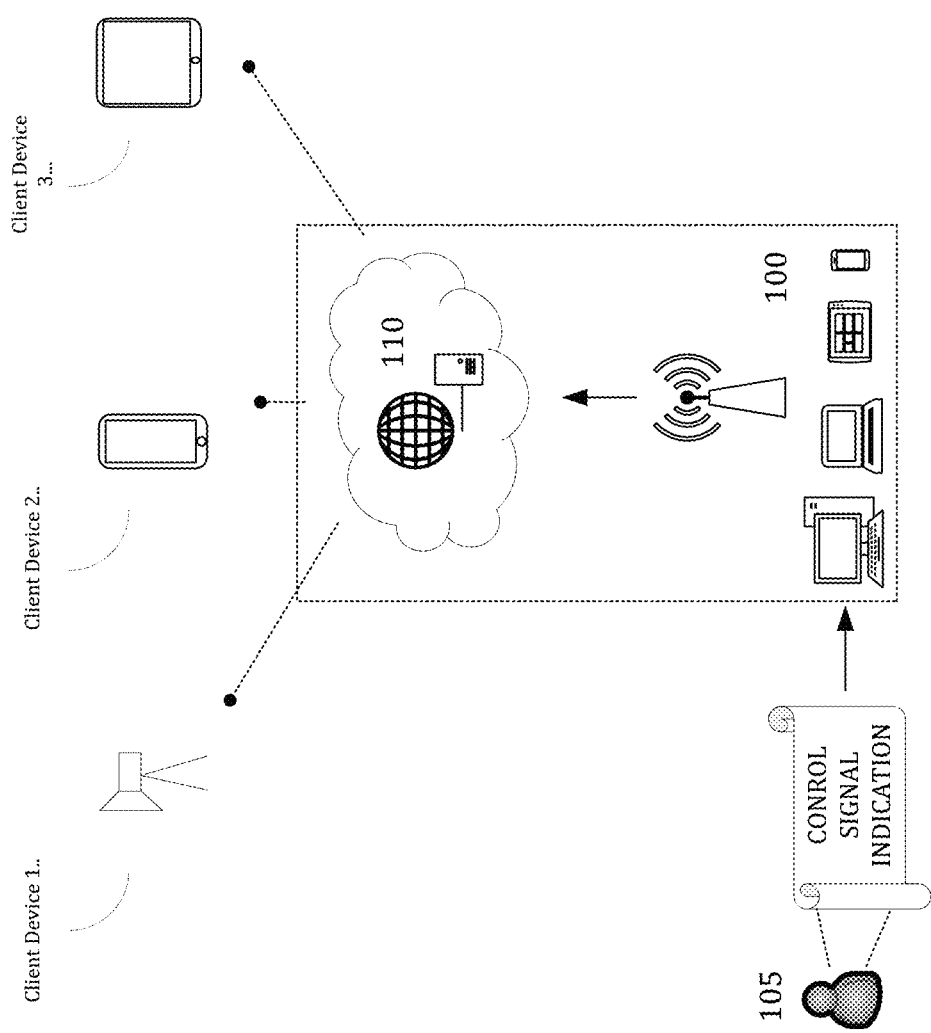
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of film production, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope. The methods, systems and devices for controlling capture of content using one or more client electronic devices may be used by individuals or companies to synchronously capture content. Accordingly, techniques of the present disclosure may be used for collaboratively capturing content such as, for example, video, using multiple content capturing devices such as, for example, smart phones. For instance, a scene including one or more physical objects may be synchronously captured using two or more video cameras. Accordingly, depending on spatial positions of the two or more video cameras, different views of the scene may be captured synchronously. One of the multiple smart phones may function as a master camera that may be used to control the operation of other smart phones that may function as a client camera. The master camera may be operated by a user called a "director" while the client camera may be operated by a user called a "camera person". An app installed on both the master camera and the client camera may enable controlling of video recording on the client camera.

Initially, the app may present a graphical user interface (GUI) to the director in order to activate recording using multiple devices. Once activated, the director may be presented with an option to select one or more other users to act as camera persons. For example, the director may be enabled to select one or more friends who are in the vicinity of the director. This may be accomplished, for example, by discovering presence of the client cameras over a Bluetooth network.

Further, the director may be enabled to send an invitation to the selected users to act as camera persons. The invitation may be sent over a communication network such as Bluetooth, Wi-Fi, etc. In some instances, the invitation may include a personal note from the director describing the purpose of the invitation, time of recording, place of recording, subject of recording and any other specific instructions to be followed by the camera persons while recording video such as a camera angle to be adopted.

Upon receiving the invitation, a user may either accept or reject the invitation. Subsequently, acceptance or rejection of the invitation corresponding to the one or more selected users may be displayed to the director. This allows the director to know who among the one or more selected users would be collaborating in recording the video.

Subsequently, the client cameras may be temporally synchronized with the master camera. For instance, a current time on the master camera may be transmitted to all the client cameras. Accordingly, the client cameras may change their current times to the current time on the master camera. Thus, both the master camera and each client camera may be synchronized in time.

Thereafter, the director may be enabled to issue commands to the client cameras in order coordinate recording of the collaborative video. For instance, the director may be enabled to initiate recording at a time $T_i$ by activating a record button on the GUI. Consequently, each client camera may begin recording of video at $T_i$. At any point in time, the director may be enabled to issue further commands such as for example, a command to pause the recording of video. Accordingly, each client camera may receive the command and pause recording. Similarly, the director may be enabled to issue a command to terminate recording of video at the client cameras.

Subsequently, the client cameras may send the respective video recordings to the master camera over a communication network such as Bluetooth or Wi-Fi. Alternatively, the video recordings from the client cameras may be transferred to the cloud from where the director may access the video recordings. Subsequently, the director may be presented with a synchronized display of all the video recordings in a split screen. Thus, the director may be able to view an event from multiple different views as synchronously captured by respective client cameras.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform consistent with embodiments of the present disclosure may be provided. The operating environment may comprise methods, systems, and devices collectively referred to as a platform. The platform may include a master electronic device and a client electronic device. The platform may further include computing devices in operative communication with the master electronic device and the client electronic device. Moreover, the platform may include a networking environment for facilitating communication between the master electronic device, client electronic device, and various computing devices. Although the present disclosure refers to various functions and operations performed by particular components of the platform (e.g., a master electronic device or client electronic devices), it should be understood that some platform components may be interchanged with others, and/or, where necessary, combined with other components to perform the functions and operations intended.

By way of non-limiting example, a collaborative content capturing platform 100 may be interconnected using a network 110. In some embodiments, network 110 may comprise a Local Area Network (LAN), a Bluetooth network, a Wi-Fi network and a cellular communication network. In other embodiments the collaborative content capturing platform may be hosted on a centralized server, such as, for example, a cloud computing service. A user 105 (e.g., director) may access platform 100 through a software application. The software application may be embodied as, for example, but not limited to, a website, a web application, a desktop application, and a mobile application compatible with a computing device 100. One possible embodiment of the software application may be provided by the camera app included on electronic devices such as smart phones and tablet computers.

As will be detailed with reference to FIG. 1 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

The computing device 100 may be configured to communicate with each of client devices 1-3 over the network 110. Further, the computing device 100 may be configured to provide a user interface to the user 105. Accordingly, the user 105 may interact with the computing device in order to control content capturing by the client devices 1-3. For example, the computing device 100 may display a GUI to the user 105 in order to select one or more of the client devices 1-3 to participate in a collaborative recording of content. Further, the GUI may enable the user 105 to enter commands corresponding to controlling capture of content such as for example, initiation of content capture, pausation of content capture and termination of content capture. Accordingly, a command entered by the user 105 may then be transmitted to the client devices 1-3 over network 110. Upon receiving the command, the client devices 1-3 may perform a content capturing operation dictated by the command. Subsequently, the content captured by the client devices 1-3 may be transferred to the computing device 100 over network 110. As a result, the user 105 may be able to consume the content recorded collaboratively.

The present disclosure relates to methods, systems and devices for capturing content using two or more electronic devices (collectively referred to as the collaborative content capturing platform). Examples of the two or more electronic devices include, but are not limited to, for example, still image camera, video camera, smart-phone, tablet computer, laptop computer, sound recorder and thermal imager. Further, an electronic device of the two or more electronic devices may include a content capturing means configured to capture content.

In general, the content may include a representation of one or more physical characteristics. For example, in some embodiments, the content may include visual content. Accordingly, the content may be a representation of optical characteristics such as, but not limited to, reflectance, transmittance, luminance and radiance. For instance, visual content corresponding to a scene may include electronic representation, such as, for example, a digital representation, of reflectance of visible light from one or more objects in the scene as captured from two or more viewpoints. Accordingly, the two or more electronic devices may be positioned at different spatial coordinates corresponding to the two or more viewpoints. Examples of content may include one or more of, but not limited to, image, video and audio. In various embodiments, the content may correspond to, but without limitation, one or more sensory modalities. The one or more sensory modalities may include visual modality, auditory modality, tactile modality, olfactory modality and gustatory modality.

In order to capture the content, the content capturing means may include one or more sensors configured for sensing one or more physical characteristics corresponding to the content. For example, the content capture means may include an image capturing device configured for sensing electromagnetic radiation in a scene and generating a corresponding electronic representation. Further, the image capturing device may be configured for sensing electromagnetic radiation corresponding to one or more wavelength bands. As an example, the image capturing device may be a video camera configured for sensing electromagnetic radiation in the visible spectrum. As another example, the image capturing device may be configured for sensing electromagnetic radiation in the infrared spectrum. In another embodiment, the content capturing means may include a microphone configured for sensing sound waves and generating a corresponding electronic representation such as, for example, a digital representation.

Figure 2:
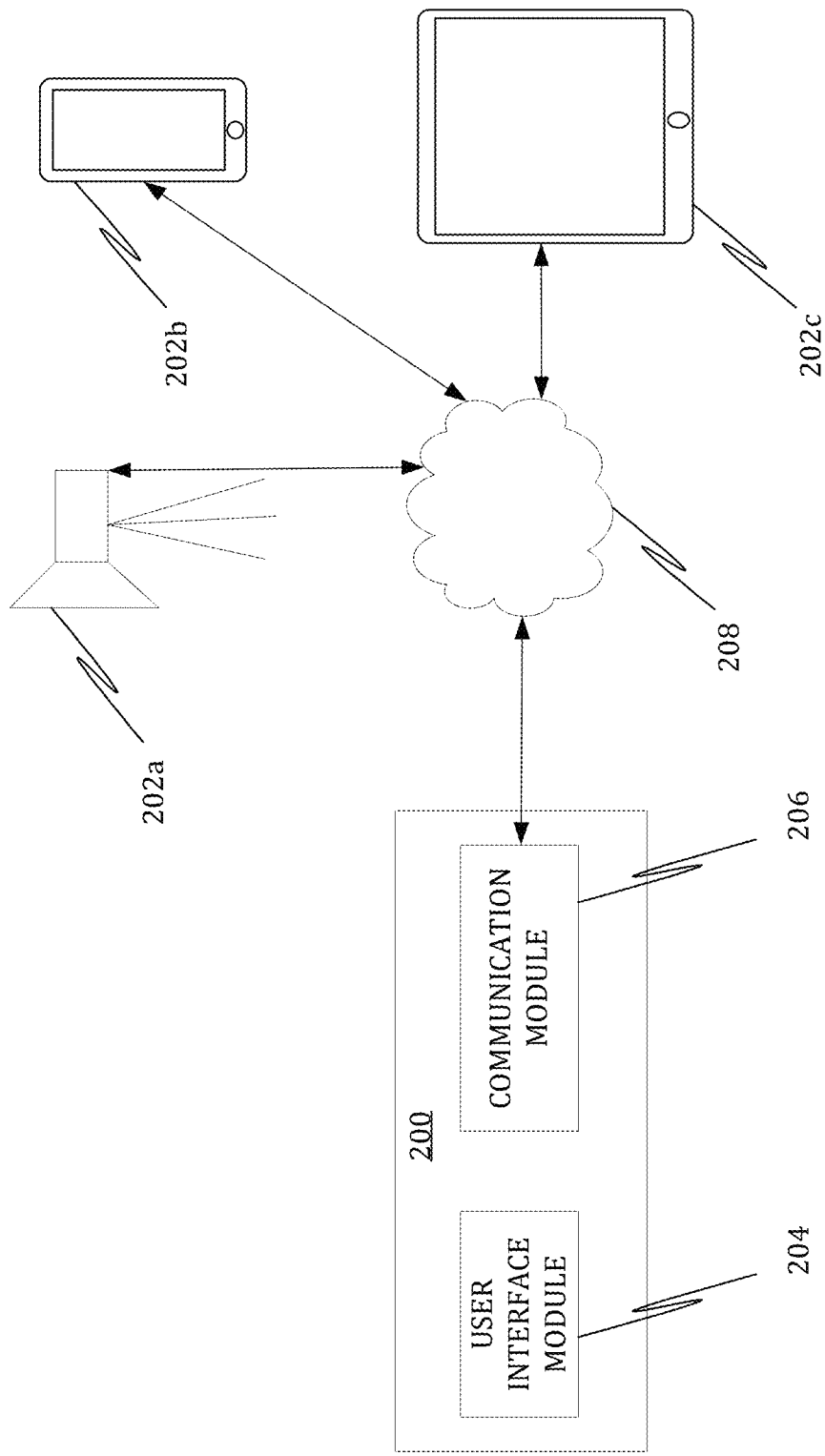
FIG. 2 illustrates a master electronic device configured to control capture of content using one or more client electronic devices according to various embodiments.

Referring to FIG. 2, a master electronic device 200 configured to be used for capturing content using the two or more electronic devices is illustrated. In various embodiments, the master electronic device 200 may be configured to control capture of content using one or more client electronic devices 202, exemplary illustrated as client electronic devices 202a, 202b and 202c. Each of the master electronic device 200 and the one or more client electronic devices 202 may be instances of the two or more electronic devices described earlier. Further, in some embodiments, an electronic device of the two or more electronic devices may be interchangeably used as either the master electronic device 200 or the client electronic device 202. Further, the two or more electronic devices may include each of the master electronic device 200 and the one or more client electronic devices 202. Accordingly, the master electronic device 200 may include content capturing means configured to capture content. In another embodiment, the two or more electronic devices may include two or more client electronic devices. Further, the master electronic device 200 may be configured to control capture of content using the two or more client electronic devices.

The master electronic device 200 may include a user interface module 204 configured to receive an indication of a control-input. In general, the user interface module 204 may be any means configured to receive input from one or more users.

In various embodiments, the user interface module 204 may include a Graphical User Interface (GUI) presented on a display device, such as, a touch-screen. In another embodiment, the user interface module 204 may include an input device such as, but not limited to, a keyboard, a mouse, a touch-pad, a stylus, a digital pen, a voice recognition device, a gesture recognition device and a gaze detection device. In some embodiments, the user interface module 204 may be implemented using one or more of hardware and software. Examples of hardware include, but are not limited to, sensors and processors.

In various embodiments, the indication of the control-input may include one or more of a touch on a GUI corresponding to the control-input, a depression of a key corresponding to the control-input, a mouse click on a GUI element corresponding to the control-input, a gesture corresponding to the control-input, a voice command corresponding to the control-input, a gesture corresponding to the control-input and a gaze corresponding to the control-input.

In general, the control-input may represent any information that may be used to control a state of one or more of the master electronic device 200 and the one or more client electronic devices 202. For instance, the control-input may represent information about which operation is to be performed, conditions under which the operation is to be performed and how the operation is to be performed. As an example, the control-input may represent information that may be used to enable or disable a functionality of one or more of the master electronic device 200 and the one or more client electronic devices 202. As another example, the control-input may represent information that may be used to trigger one or more of the master electronic device 200 and the one or more client electronic devices 202 to perform one or more operations. Accordingly, the control-input may include an operation indicator corresponding to the one or more operations. Examples of the one or more operations include, but are not limited to, setting one or more parameters corresponding to content capture, initiation of content capture, pausation of content capture, termination of content capture, transformation of captured content, storage of captured content and transmission of captured content.

Further, the control-input may represent information that indicates a context in which the one or more operations are to be performed. The context may generally include values corresponding to situational variables such as, but not limited to, time, place and one or more environmental conditions corresponding to the one or more client electronic devices 202. For example, the context may include range of coordinates of a region. Accordingly, the one or more client electronic devices 202 may be triggered to perform the one or more operations when the one or more client electronic devices 202 are located within the region. As another example, the context may include a range of time values. Accordingly, in various embodiments, each of the master electronic device 200 and the one or more client electronic devices 202 may be triggered to perform the one or more operations at the range of time values. As yet another example, the context may include a predetermined state of one or more sensors include in one or more of the master electronic device 200 and the one or more client electronic devices 202. The one or more sensors may include, but are not limited to, accelerometer, gyroscope, magnetometer, barometer, thermometer, proximity sensor, light meter and decibel meter. Further, the control-input may also include one or more rules that may specify one or more conditions and corresponding to one or more actions to be performed by the one or more client electronic devices 202. For example, a rule may specify the one or more client electronic devices 202 to initiate capture of content upon detection of a moving object in the field of view of the one or more client electronic devices 202. As another example, a rule may specify initiation of capture of content by each of the master electronic device 200 and the one or more client electronic devices 202 upon detection of a predetermined object in the field of view of each of the master electronic device 200 and the one or more client electronic devices 202.

In an exemplary embodiment, the control-input may include a time value. In general, the time value may be any value based on time. In various embodiments, the time value may indicate one or more instants of time. In another embodiment, the time value may indicate a period of time, such as for example, a duration spanning a start time and an end time.

In an instance, the time value may include a standard time value. The standard time value may be a time value maintained by a time measuring device external to each of the master electronic device 200 and the one or more client electronic devices 202. For example, the standard time value may be maintained by a time keeping device at a national or an international scientific organization. The standard time value may be expressed in units of time such as, but not limited to, year, month, day, hour, minute and second. An example of the standard time value may be 2017, Jan. 1, 10 am.

In another instance, the time value may be a relative time value. The relative time value may be in relation to common time value available to each of the master electronic device 200 and the one or more client electronic devices 202. In an instance, the common time value may be the standard time value. In various embodiments, the standard time value may be maintained by a communication service provider, such as, for example, a cellular communication provider. Accordingly, in various embodiments, each of the master electronic device 200 and the one or more client electronic devices 202 may be configured to receive the standard time value from the cellular communication provider. Further, the relative time value may be expressed in units of time such as, for example, minutes or seconds in relation to the standard time value. In other words, in various embodiments, each of the master electronic device 200 and the one or more client electronic devices 202 may be synchronized to the common time value, such as the standard time value. Accordingly, the relative time value may represent a time differential in relation to the common time value.

In an instance, the time value may include the time at which the indication of the control-input is received through the user interface module 204 of the master electronic device 200. In another instance, the time value may include the time at which a means configured for capturing content, included in the master electronic device 200, is activated in response to the control-input.

Figure 3:
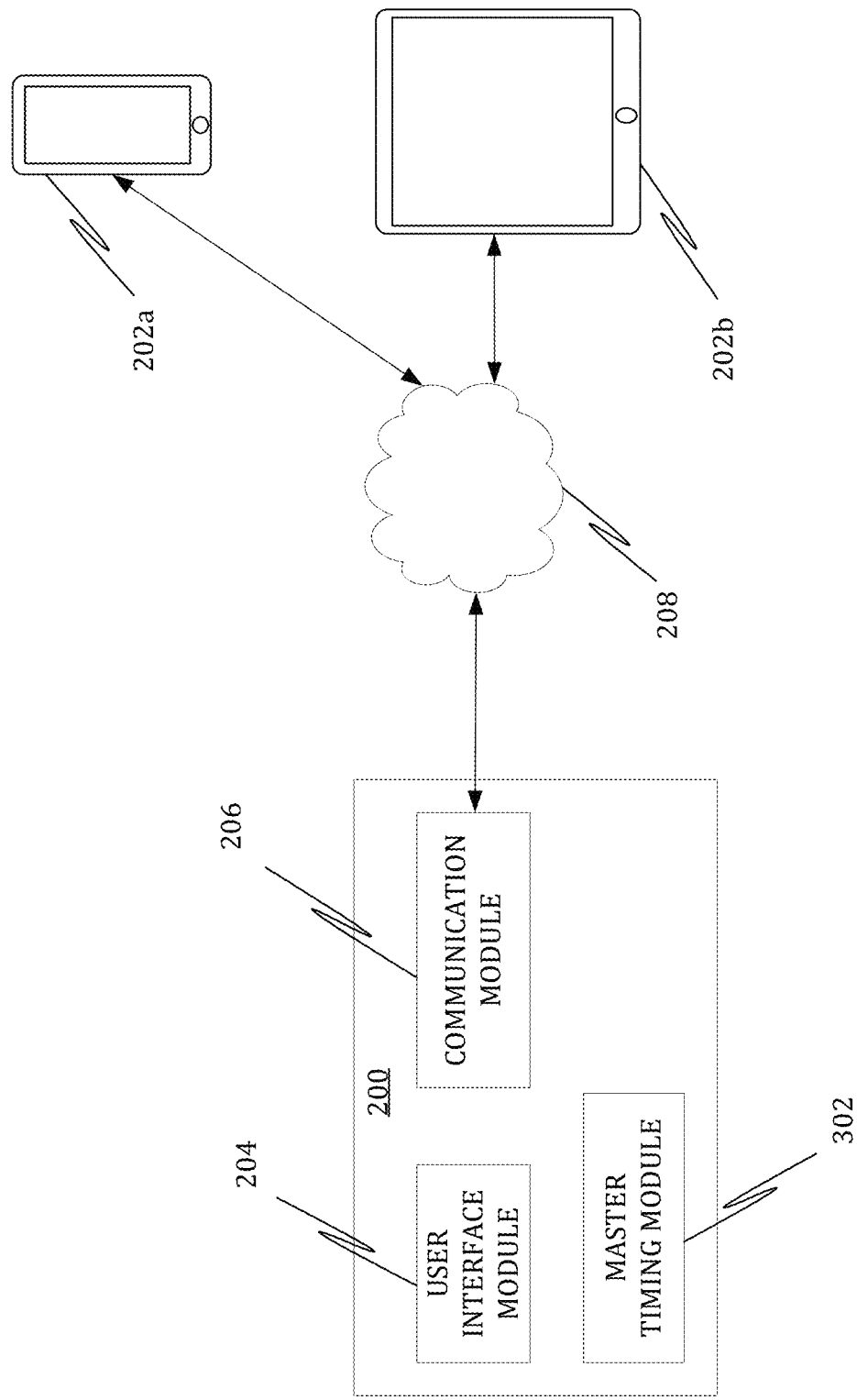
FIG. 3 illustrates a master electronic device configured to control capture of content using one or more client electronic devices according to another embodiment.

In various embodiments, the master electronic device 200 may include a master timing module 302 configured for measuring time as illustrated in FIG. 3. In an instance, the master timing module 302 may include each of a crystal oscillator and a digital counter. The crystal oscillator may be configured for generating a periodic signal of a predetermined frequency. The digital counter may be configured to count a number of pulses in the periodic signal. In various embodiments, the master timing module 302 may be implemented in the form of firmware included in the master electronic device 200. For example, a smart-phone may include a dedicated timer circuitry configured for measuring time. In another embodiment, the master timing module 302 may be implemented in the form of a general purpose processor included in the master electronic device 200, such as, for example, a processor of a smart-phone. Accordingly, in an instance, the time value may include an output of the master timing module 302, such as, for example, the output of the digital counter. Further, the one or more client electronic devices 202 may include a client timing module 702 configured for measuring time. The client timing module 702 may be implemented in a manner similar to that of the master timing module. Further, the client timing module 702 may be configured to be synchronized with the master timing module 302 based on the time value.

Further, in various embodiments, in addition to the time value, the user interface module 204 may be configured to receive an indication of one or more operations. The one or more operations may be, but is not limited to, setting one or more parameters corresponding to content capture, initiation of content capture, pausation of content capture, termination of content capture, transformation of content capture, storage of content capture and transmission of content capture. Accordingly, based on each of the time value and the indication of one or more operations, the one or more client electronic devices 202 may be configured to perform the one or more operations at a time indicated in the time value. For example, the user interface module 204 in the master electronic device 200 may be configured to receive the indication of control-input including each of an indication to capture content and the time value including a start time and an end time. Accordingly, the one or more client electronic devices 202 may be configured to start capture of content at the start time and terminate capture of content at the end time.

Furthermore, in various embodiments, based on the time value, each of the master electronic device 200 and the one or more client electronic devices 202 may be configured to capture content synchronously. For example, the time value may indicate a time in future when each of the one or more client electronic devices 202 is instructed to capture content of a scene from corresponding viewpoints. Further, the master electronic device 200 may also capture content of the scene from a different viewpoint starting from the time. Accordingly, each of the master electronic device 200 and the one or more client electronic devices 202 may capture content of the scene at the same time but from different viewpoints.

Further, the control-input may represent information that may indicate values of one or more parameters corresponding to one or more of the master electronic device 200 and the one or more client electronic devices 202 to be used while capturing content. The one or more parameters may control how content capture is to be performed. For example, the one or more parameters corresponding to a video camera may include, but are not limited to, resolution, frame rate, white balance, gain, shutter speed, aperture setting and focus.

Additionally, in various embodiments, the master electronic device 200 may include a communication module 206 configured to communicate data between the master electronic device 200 and the one or more client electronic devices 202. The communication module 206 may be configured to communicate data over one or more communication channels 208. Accordingly, the one or more client electronic devices 202 may include corresponding one or more communication modules configured to communicate over the one or more communication channels 208, exemplary illustrated as communication channel 208.

The one or more communication channels 208 may include one or more of a common local-area-network connection, a Wi-Fi connection, and a Bluetooth connection. For example, the communication module 206 may include a Bluetooth transceiver configured to perform one or more of transmission and reception of data over a Bluetooth communication channel. As another example, the communication module 206 included in the master electronic device 200 such as, for example, a smart-phone, may be a cellular transceiver configured to perform one or more of transmission and reception of radio frequency signals over a cellular communication network. As yet another example, the communication module 206 may include a network interface module configured for communicating over a packet switched network such as, for example, the Internet. In various embodiments, each of the master electronic device 200 and the one or more client electronic devices 202 may be configured to communicate over an ad-hoc wireless network. Accordingly, the master electronic device 200 may be configured to transmit a request to the one or more client electronic devices 202 to form the ad-hoc wireless network. In various embodiments, the master electronic device 200 may communicate data with the one or more client electronic devices 202 over a personal area network (PAN).

In various embodiments, the communication of data between the master electronic device 200 and the one or more client electronic devices 202 may include wireless transmission of the control-input to the one or more client electronic devices 202. Accordingly, the communication module 206 included in the master electronic device 200 may be configured to perform one or more of transmission and reception of electromagnetic waves.

In various embodiments, the communication module 206 may be configured for wireless transmission of the control-input to each client electronic device of the one or more client electronic devices 202. In another embodiment, the communication module 206 may be configured for wireless transmission of the control-input to a first client electronic device of the one or more client electronic devices 202. Further, the first client electronic device may be configured for transmission of the control-input to a second client electronic device of the one or more client electronic devices 202. In yet another embodiment, the communication module 206 included in the master electronic device 200 may be configured to communicate with the one or more client electronic devices 202 to a server. In other words, the master electronic device 200 may be configured to communicate data to the server. Further, the server may be configured to communicate the data to the one or more client electronic devices 202.

In another embodiment, the communication module 206 included in the master electronic device 200 may be configured for reception of content captured by the one or more client electronic devices 202. Accordingly, the one or more client electronic devices 202 may be configured for transmission of content captured by the one or more client electronic devices 202. In an instance, the communication module 206 included in the master electronic device 200 may be configured for reception of content captured by the one or more client electronic devices 202 by communicating with a server. Accordingly, the one or more client electronic devices 202 may be configured for transmission of the content captured by the one or more client electronic devices 202 to the server. As an example, each of the one or more client electronic devices 202 such as, for example, smart phones may be configured to capture content in response to the control-input received from the master electronic device 200. Further, the one or more client electronic devices 202 may be configured for transmission of the captured content a cloud server. Furthermore, the master electronic device 200 may be configured to communicate with the cloud server in order to receive the content captured by the one or more client electronic devices 202.

Figure 4:
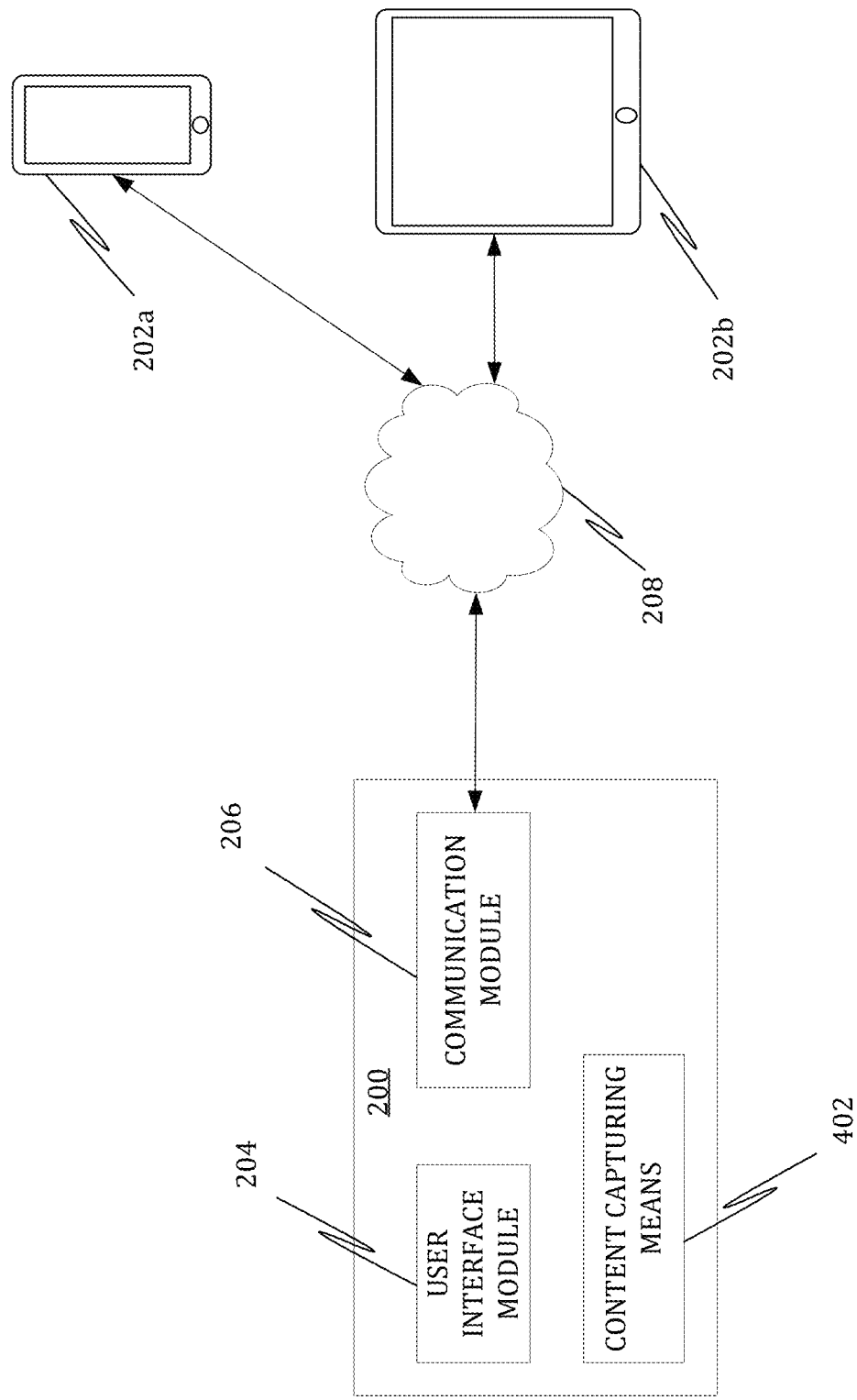
FIG. 4 illustrates a master electronic device configured to control capture of content using one or more client electronic devices according to yet another embodiment.

In another embodiment, the master electronic device 200 may include a content capturing means 402 configured to capture content as illustrated in FIG. 4. Details about the content capturing means 402 included in the master device may be understood from description of the content capturing means 402 included in the one or more client electronic devices 202. For instance, the master electronic device 200 may include one or more of an image capturing device such as, for example, a camera and a sound capturing device such as, for example, a microphone. Further, in various embodiments, the communication module 206 included in the master electronic device 200 may be configured for wireless transmission of content captured by the master electronic device 200.

Figure 8:
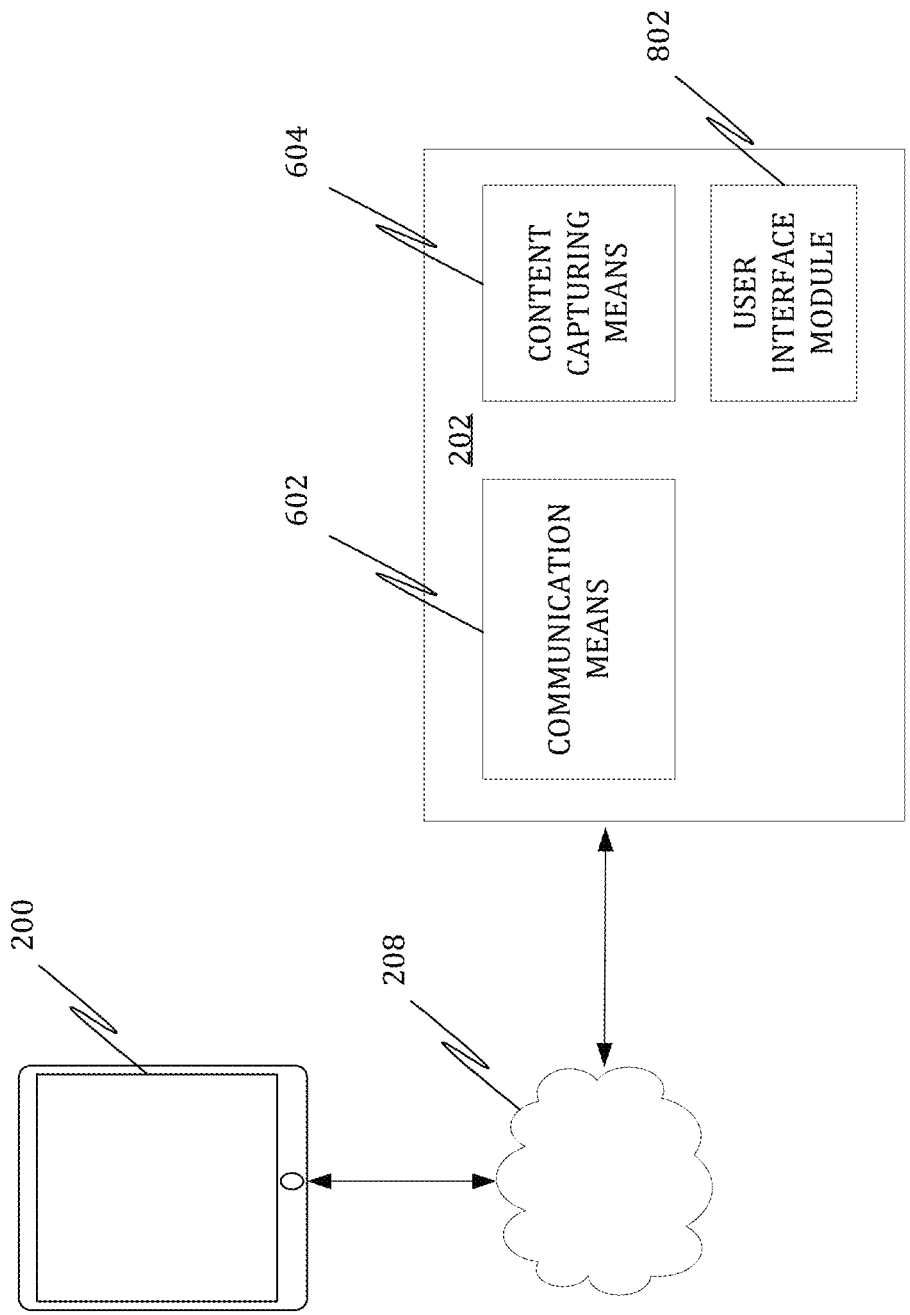
FIG. 8 illustrates a master electronic device configured to control capture of content using one or more client electronic devices according to still another embodiment.

In various embodiments, the user interface module 204, included in the master electronic device 200, may be further configured to receive an invite input. Accordingly, the communication module 206 may be further configured for wireless transmission of an invitation to the one or more client electronic devices 202 based on the invite input. The invitation may correspond to a request to join a content capture session. In various embodiments, the content capture session may include a plurality of electronic devices. Further, the one or more client electronic devices 202 may be configured for reception of the invitation. Furthermore, the one or more client electronic devices 202 may be configured to receive an accept-invite input through a user interface module 802 included in the one or more client electronic devices 202 as illustrated in FIG. 8. As a result, in an instance, a user of the master electronic device 200, such as a first smart-phone, may provide the invite input through the user interface module 204 included in the first smart phone. The invite input may be provided through a user interface such as a touch screen of the first smart phone. Accordingly, the invitation to capture content may be transmitted to the one or more client electronic devices 202, such as a second smart-phone. Further, the invitation may be presented on a user interface, such as a touch screen, on the second smart-phone. Subsequently, a user of the second smart phone may accept the invitation by providing an accept-invite input through the user interface of the second smart phone. Consequently, each of the first smart phone and the second smart phone may be able to capture content collaboratively. For instance, each of the first smart phone and the second smart phone may be able to capture content of a scene synchronously from different viewpoints.

Figure 5:
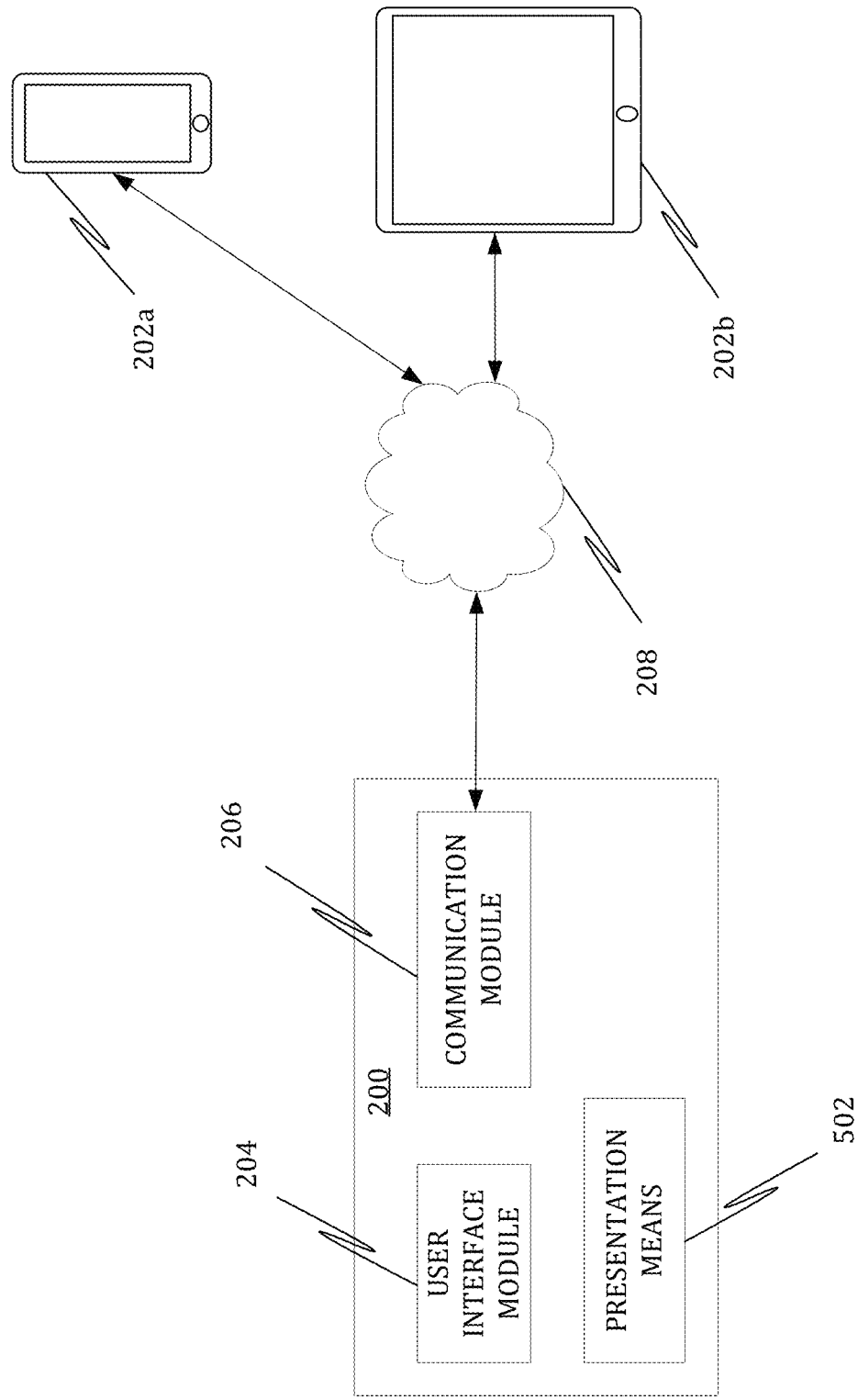
FIG. 5 illustrates a master electronic device configured to control capture of content using one or more client electronic devices according to a further embodiment.
Figure 6:
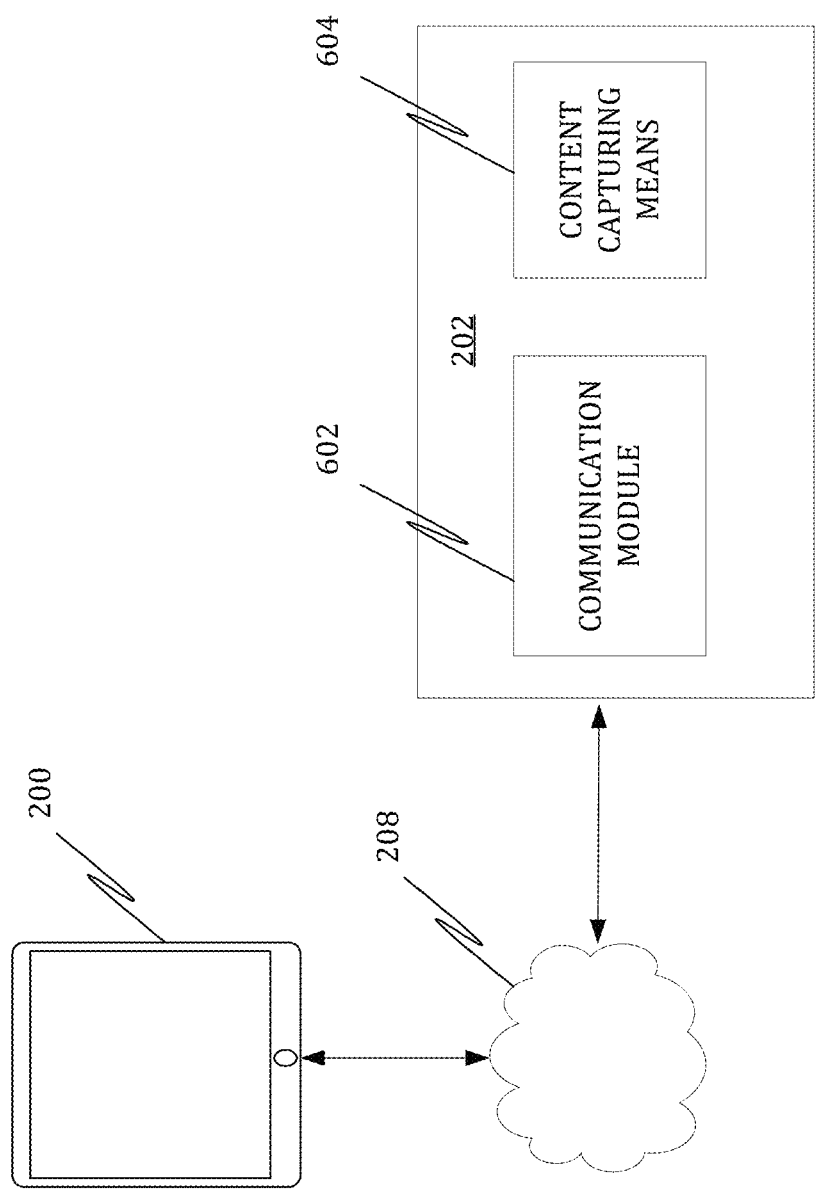
FIG. 6 illustrates a master electronic device configured to control capture of content using one or more client electronic devices according to another embodiment.

In another embodiment, the master electronic device 200 may include a presentation means 502 configured to present content captured by one or more of the master electronic device 200 and the one or more client electronic devices 202 as illustrated in FIG. 5. For instance, the master electronic device 200 may be a smart phone including a touch screen display configured to display content such as, for example, video captured by the one or more client electronic devices 202 such as tablet computers. Further, the touch screen display may be configured to concurrently display each of video captured by the smart phone and video captured by the tablet computers. For instance, the smart phone may be configured to display video captured by the smart phone on a first display region of the touch screen display and concurrently display video captured by the tablet computers on a second display region of the touch screen display. As a result, a user of the master electronic device 200 may be able to view a scene captured from different viewpoints.

According to another embodiment, a client electronic device 202 configured to control capture of content is illustrated in FIG. 5. The client electronic device 202 may be an instance of the one or more client electronic devices 202 described earlier in conjunction with FIG. 2 to FIG. 5. The client electronic device 202 may include a communication module 602 configured to communicate data between the client electronic device 202 and the master electronic device 200. In various embodiments, the communication module 602 included in the client electronic device 202 may be configured for wireless transmission over one or more communication channels 208. The one or more communication channels 208 may include one or more of a local-area-network connection, a Wi-Fi connection, and a Bluetooth connection. Further details about the master electronic device 200 are described in relation to FIG. 2 to FIG. 5. In an instance, the communication module 602 included in the client electronic device 202 may be configured for wireless reception of the control-input transmitted by the master electronic device 200. Additionally, the client electronic device 202 may include a content capturing means 604 to capture content in response to the control-input. The content capturing means 604 may be activated in response to the control-input received from the master electronic device 200. In various embodiments, the content capturing means 604 may include one or more of an image capturing means such as a video camera and a sound capturing means such as a microphone. Accordingly, in various embodiments, the content captured by the client electronic device 202 may include one or more of an image and a sound.

Figure 7:
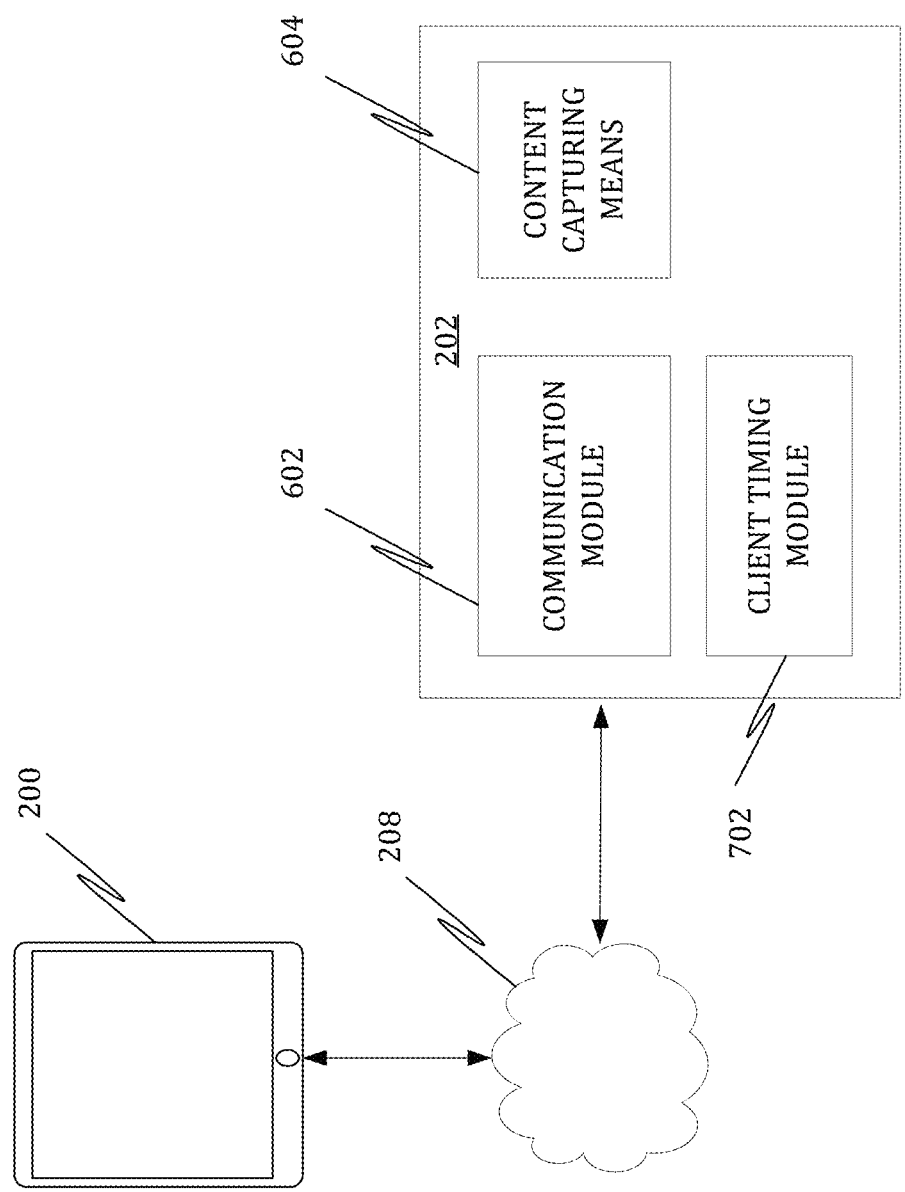
FIG. 7 illustrates a master electronic device configured to control capture of content using one or more client electronic devices according to a yet another embodiment.

In various embodiments, the communication module 602 included in the client electronic device 202 may be configured for receiving the time value transmitted by the master electronic device 200. The time value may correspond to one or more of initiation of capture of the content, pausation of capture of the content and termination of capture of the content. In addition, in various embodiments, the client electronic device 202 may include a client timing module 702 configured to be synchronized with the master timing module 302 included in the master electronic device 200 as illustrated in FIG. 7. Details regarding the client timing module 702 may be understood from description of master timing module 302 provided above. Further, the synchronization of the client timing module 702 with the master timing module 302 may be based on the time value received from the master electronic device 200. Accordingly, each of the master electronic device 200 and the client electronic device 202 may be configured to have a common time base. As a result, in an instance, each of the content captured by the master electronic device 200 and the content captured by the client device may correspond to the same time instants. For example, in various embodiments, each of the client electronic device 202 and the master electronic device 200 may be configured to capture content synchronously in response to the control-input.

In various embodiments, the communication module 602 included in the client electronic device 202 may be configured for reception of an indication of one or more operations in addition to the time value. Further, the client electronic device 202 may include a processor configured to perform the one or more operations at a time indicated in the time value.

In another embodiment, the communication module 602 may be further configured for wireless reception of the invitation from the master electronic device 200. The invitation may be a request to participate in a collaborative content capture session. Accordingly, in various embodiments, the user interface module 802 included in the client electronic device 202 may be further configured for reception of the accept-invite input. Further, the content capture means included in the client electronic device 202 may be configured to capture content based on reception of the accept-invite input.

In various embodiments, two or more client electronic devices, which are instances of the client electronic device, may receive the invitation to participate in a collaborative content capture session. In another embodiment, the client electronic device 202 may receive the invitation to participate in a collaborative content capture session with the master electronic device 200. In other words, each of the master electronic device 200 and the client electronic device 202 may be configured to collaboratively capture content. For instance, each of the master electronic device 200 and the client electronic device 202 may capture content corresponding to a scene including one or more physical objects. As another instance, the master electronic device 200 may be configured to capture content corresponding to a first scene while the client electronic device 202 may be configured to capture content corresponding to the second scene.

Further, in various embodiments, the communication module 602 included in the client electronic device 202 may be configured for wireless transmission of content captured by the client electronic device 202 to the master electronic device 200.

In another embodiment, the communication module 602 included in the client electronic device 202 may be configured for wireless transmission of content captured by the electronic device to another client electronic device. Accordingly, in various embodiments, the communication module 602 included in the client electronic device 202 may be further configured for wireless reception of content captured by one or more of the master electronic device 200 and another client electronic device.

Further, the communication module 206 included in the master electronic device 200 may be configured for wireless transmission of content captured by the master electronic device 200 to the client electronic device. As a result, in various embodiments, content captured by one or more of the master electronic device 200 and one or more client electronic devices 202 may be shared with the master electronic device 200 and/or one or more client electronic devices 202.

III. Platform Operation

In accordance with various embodiments, a user of the master electronic device 200 called a "director" may be enabled to control content capturing using the one or more client electronic devices 202 operated by users called "camera persons". Initially, the director may be presented with a GUI to select one or more camera persons. Accordingly, the one or more client electronic devices 202 associated with the one or more camera persons may be identified and selected.

Subsequently, the director may be enabled to invite the one or more camera persons to participate in a collaborative content capturing session. Consequently, the invitation may be transmitted to the one or more client electronic devices 202 from the master electronic device 200.

Subsequently, the invitation may be displayed on a display screen of the one or more client electronic devices 202. Further, the one or more camera persons may be presented with an option to either accept or reject the invitation. Accordingly, acceptance or rejection of the invitation may be transmitted back to the master electronic device 200.

Thereafter, the master electronic device 200 may display acceptance or rejection of the invitation corresponding to each of the one or more client electronic devices 202. Further, in some embodiments, each of the master electronic device 200 and the one or more client electronic devices may be configured to display names of each of the director and the one or more camera persons who accepted the invitation. Additionally, in some embodiments, details about the one or more client electronic devices 202 such as, but not limited to, device type, Operating System type and content capturing capabilities such as max. camera resolution, max. zoom level, max. frame rate etc. may be presented to the director.

Subsequently, the director may provide the indication of the control-input through the GUI of the master electronic device 200 to control capture of content in collaboration with the one or more client electronic devices 202. For instance, the indication may correspond to an operation such as, for example, initiation of content capture, pausation of content capture and termination of content capture. Thereafter, the control-input may be transmitted to the one or more client electronic devices 202. Upon receiving the control-input, the one or more client electronic devices 202 may perform one or more operations in relation to one or more of capturing content, storing captured content, processing captured content and transmitting captured content. For instance, upon receiving the indication of initiation of content capture, the one or more client electronic devices 202 may start capturing content synchronously. Similarly, upon receiving the indication of termination of content capture, the one or more client electronic devices 202 may stop capturing content.

Subsequently, the content captured by each of the one or more client electronic devices 202 may be transmitted to the master electronic device 200. Further, the content may be synchronously displayed on a display screen of the master electronic device 202. Thus, the director may be able to view content captured by the one or more client electronic devices 202.

The following discloses the various operations platform components may be performed. Although methods of FIG. 9-11 have been described to be performed by various components of platform 100, it should be understood that any electronic device (e.g., master electronic device 200, client electronic device 202, a computing device 100 may be configured to perform the various stages of methods of FIG. 9-11 in any reasonable combination or, where feasible, individually. Furthermore, in some embodiments, different operations may be performed by different networked elements in operative communication.

Figure 9:
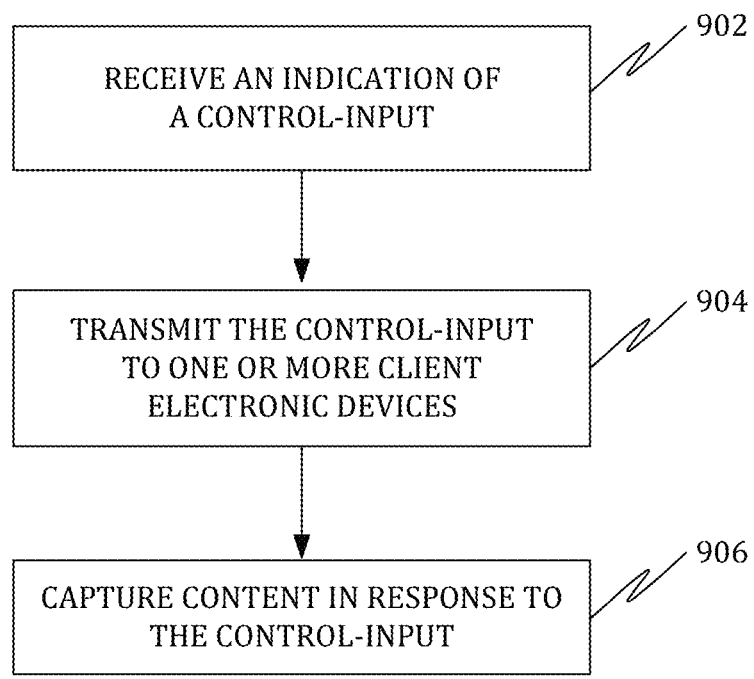
FIG. 9 illustrates a flowchart of a method of controlling capture of content using one or more electronic devices according to various embodiments.

FIG. 9 illustrates a flow chart of a method of controlling capture of content using one or more client electronic devices 202 according to various embodiments of the present disclosure. The method includes receiving the indication of the control-input at the master electronic device 200 at step 902. In an instance, the control-input may correspond to one or more of initiating capture of the content, pausing capture of the content and terminating capture of the content.

In various embodiments, the control-input may correspond to one or more operations performable by the one or more client electronic devices 202 in relation to one or more of capturing content, processing captured content, storing captured content and transmitting captured content. For example, the control-input may correspond to one or more of, increasing zoom level, decreasing zoom level, panning, altering focus, selecting a camera filter, selecting a shutter speed, selecting an aperture size, selecting a frame rate, selecting between color mode and grayscale mode, selecting an encoding format, indicating a destination where the captured content is to be transmitted, selecting a processing to be performed on the captured content etc. Accordingly, the control-input may include parameter values corresponding to the one or more operations.

In an instance, the indication of the control-input may be received through a GUI presented on the master electronic device 200. For example, the GUI presented on the mater electronic device may provide an option to control content capture using the one or more client electronic devices 202. Accordingly, when a user of the master electronic device 200 selects the option, the control-input may be received by the master electronic device 200. In various embodiments, the indication may be received in the form of a touch interaction provided by the user. In another embodiment, the indication may be received in the form of a voice command.

The method further includes communicating data between the master electronic device 200 and the one or more client electronic devices 202 at step 904. In various embodiments, the communicating includes wirelessly transmitting the control-input to one or more client electronic devices 202. In various embodiments, the transmitting may be performed over one or more of a common local-area-network connection, a Wi-Fi connection, and a Bluetooth connection. Accordingly, in various embodiments, each of the master electronic device 200 and the one or more client electronic devices 202 may be wirelessly interconnected into a network of electronic devices. In various embodiments, the control-input may be transmitted to each of the one or more client electronic devices 202 concurrently. As a result, each of the one or more client electronic devices 202 may receive the control-input at the same time. In another embodiment, the control-input may be transmitted to two or more client electronic devices of the one or more client electronic devices 202 at different time instants.

Subsequent to transmitting the control-input, the one or more client electronic devices 202 may perform one or more operations in relation to one or more of capturing content, processing captured content, storing captured content and transmitting captured content. Further, based on the parameter values included in the control-input, the one or more operations may be accordingly performed.

In some embodiments, the one or more client electronic devices 202 may perform capturing of content in response to the control-input at step 906. As a result, a user of the master electronic device 200 may be able to control capture of content performed by the one or more client electronic devices 202. For instance, the user may be able to control when the one or more client electronic devices 202 initiate or terminate capture of content.

In another embodiment, subsequent to transmitting the control-input, two or more client electronic devices of the one or more client electronic devices 202 may perform capturing of content based on the control-input. For example, consider a scenario where the master electronic device 200 transmits the control-input to each of a first client electronic device, such as a Standard Definition (SD) video camera located at a first location and a second client electronic device, such as a High-Definition (HD) video camera located at a second location. Further, consider each of the SD video camera and the HD video camera aimed at the same scene including one or more physical objects. Accordingly, upon receiving the control-input, each of the SD video camera and the HD video camera may capture content corresponding to the scene.

Figure 10:
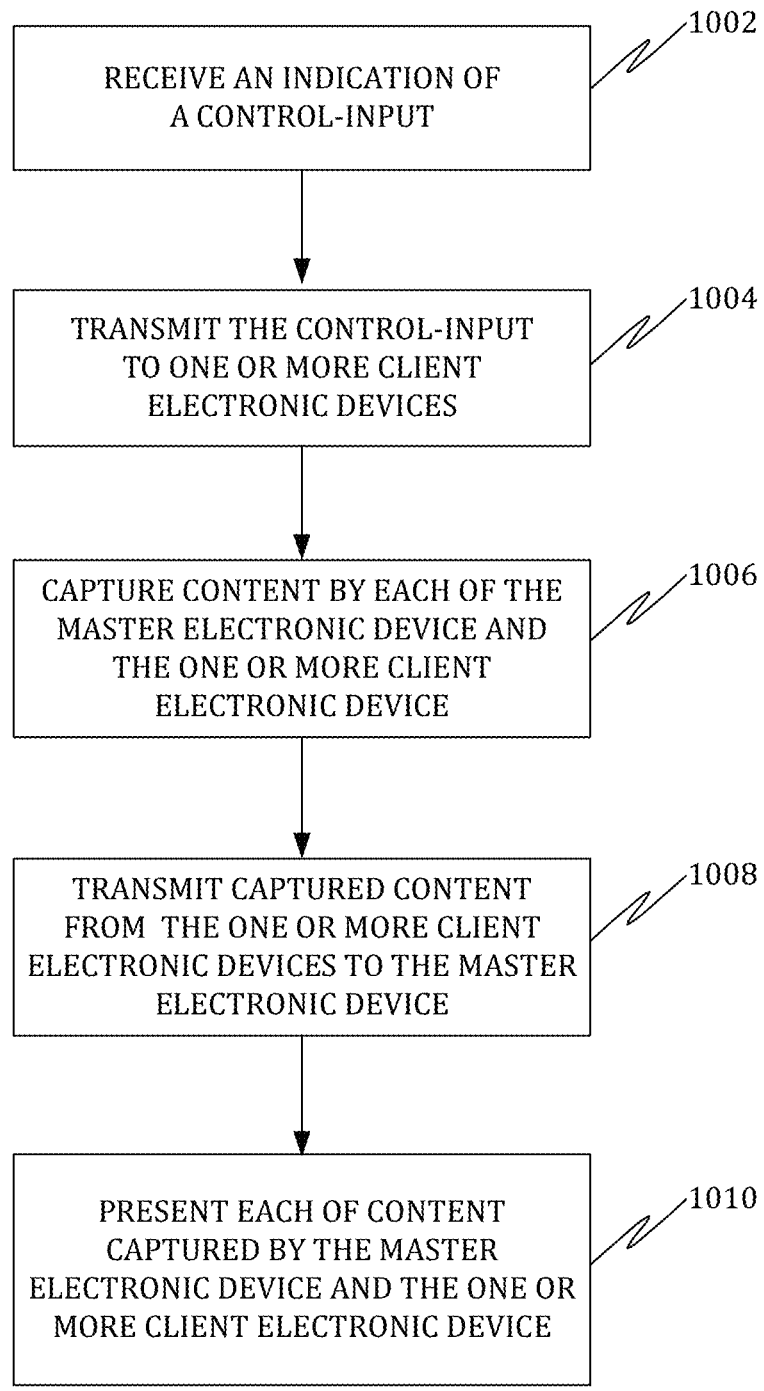
FIG. 10 illustrates a flowchart of a method of controlling capture of content using one or more electronic devices according to another embodiment.

FIG. 10 illustrates a flow chart of a method of controlling capture of content using one or more client electronic devices 202 according to another embodiment. The method includes receiving the indication of the control-input at the master electronic device 200 at step 1002. The indication may be received for instance through a GUI displayed on the master electronic device 200. For example, a user of the master electronic device 200 may wish to control capture of content using each of the master electronic device 200 and one or more client electronic devices 202. Accordingly, the user may provide the indication. In an instance the indication may include one or more device identifiers corresponding to the one or more client electronic devices 202. The one or more device identifiers may include, but are not limited to, machine identifiers such as serial numbers and network identifiers such as MAC address and IP address. In another instance, the indication may include one or more user identifiers corresponding to the one or more client electronic devices 202. Examples of the one or more user identifiers may include name, pseudonym, nickname and profile details.

Further, in an embodiment the control-input may include the time value. The time value may in one instance include the standard time at the master electronic device 200 at the time of transmitting the time value. Accordingly, in some embodiments, the method may include retrieving the standard time from the master timing module 302. In an instance, the retrieving may be performed by making an Application Programming Interface (API) call to an Operating System (OS) executing on the master electronic device 200. Subsequently, the standard time value may be encoded in a predetermined format and included in the control-input. Thereafter, up on receiving, the control-input, the one or more client electronic devices 202 my retrieve the standard time from the control-input. Further, in some embodiments, the one or more client electronic devices 202 may synchronize corresponding client timing module 702 to the standard time retrieved from the control-input.

In addition, in various embodiments, the time value may include one or more time instants corresponding to one or more operations corresponding to content capture. For example, the one or more operations may include, but are not limited to, initiating content capture, pausing content capture, terminating content capture, processing of captured content, storing of captured content and transmitting of captured content.

At step 1004, the control-input may be wirelessly transmitted to the one or more client electronic devices 202. In various embodiments, the control-input may be transmitted to the one or more client electronic devices 202 over a wireless communication channel such as, for example, a Wi-Fi network. Accordingly, in an instance each of the master electronic device 200 and the one or more client electronic devices 202 may be connected to the Wi-Fi network.

Subsequently, at step 1006, content capture may be performed by each of the master electronic device 200 and the one or more client electronic devices 202 based on the control-input. In some embodiments, the control-input may include parameter values corresponding to a region within a field of view of the one or more client electronic devices 202. Accordingly, the one or more client electronic devices 202 may be configured to capture content corresponding to the region. In an instance, the region may be specified by a user operating the master electronic device 200 in terms of screen coordinates. In another instance, the region may be specified as corresponding to an object within the field of view. For example, the control-input may include parameter values corresponding to an object of interest. Accordingly, the one or more client electronic devices 202 may be configured to capture content corresponding to the object. To this end, the one or more client electronic devices 202 may be configured to detect presence of the object in the field of view by using techniques such as object recognition.

In various embodiments, each of the master electronic device 200 and the one or more client electronic devices 202 may perform the one or more operations at the one or more time instants indicated by the time value. For instance, initiation of content capture may be concurrently performed at each of the master electronic device 200 and the one or more client electronic devices 202 at a start time indicated by the time value. Similarly, termination of content capture may be concurrently performed at each of the master electronic device 200 and the one or more client electronic devices 202 at an end time indicated by the time value. As a result, each of the master electronic device 200 and the one or more client electronic devices 202 may capture content synchronously.

Thereafter, at step 1008, the content captured by the one or more client electronic devices 202 may be transmitted. In various embodiments, the content captured by the one or more client electronic devices 202 is transmitted to the master electronic device 200. For instance, the content captured may be transmitted over the Wi-Fi network. In another instance, the content captured by the one or more client electronic devices 202 may be transmitted to a server. Subsequently, the server may transmit the captured content to the master electronic device 200. As a result, content captured by each of the one or more client electronic devices 202 and the master electronic device 200 may be available at the master electronic device 200.

Accordingly, in various embodiments, at step 1010, each of the content captured by the master electronic device 200 and the one or more client electronic devices 202 may be presented on the master electronic device 200. Alternatively, in another embodiment, one or more of the content captured by the master electronic device 200 and the one or more client electronic devices 202 may be presented on the master electronic device 200.

Figure 11:
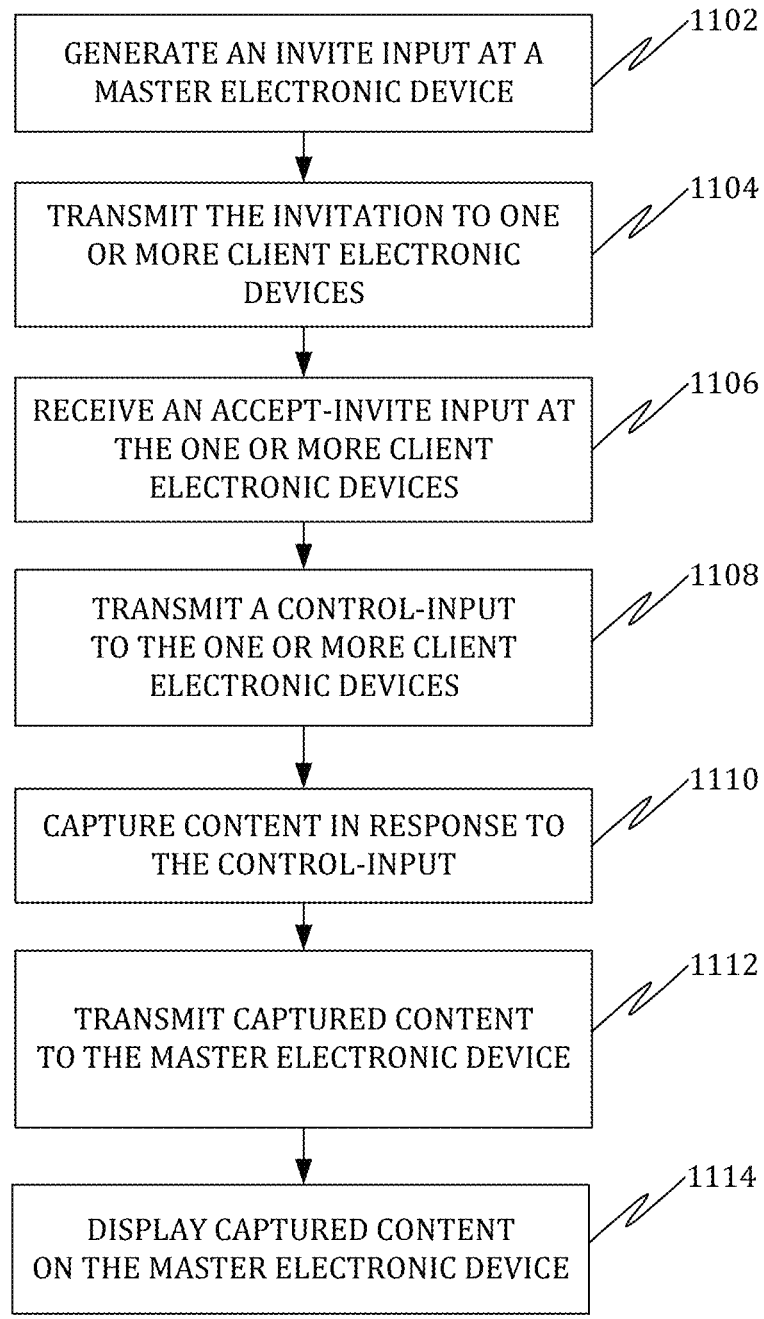
FIG. 11 illustrates a flowchart of a method of controlling capture of content using one or more electronic devices according to yet another embodiment.

FIG. 11 illustrates a flow chart of a method of controlling capture of content using one or more client electronic devices 202 in accordance with another embodiment. According to the embodiment, a user of the master electronic device 200 may wish to capture content using a plurality of electronic devices, such as, but not limited to, still image camera, video camera, smart phone, laptop computer and tablet computer. In an instance, the plurality of electronic devices may include each of the master electronic device 200 and the one or more client electronic devices 202. Accordingly, the master electronic device 200 operated by the user may be used for controlling capture of content using the one or more client electronic devices 202.

In order to control capture of content using the plurality of electronic devices, at step 1102, the user may provide the invite input at the master electronic device 200. For instance, a GUI displayed on a touch screen of the master electronic device 200 may include an option corresponding to the invite input. Accordingly, the user may provide the invite input by selecting the option, for example, by touching a portion of the touch screen corresponding to the option. As a result, the invitation corresponding to the invite input may be generated by the master electronic device 200.

Subsequently, at step 1104, the invitation may be sent to the one or more client electronic devices 202. In various embodiments, the user may identify the one or more client electronic devices 202 to be used for capture of content. For instance, the user may provide one or more names of one or more other users corresponding to the one or more client electronic devices 202, for example, through the GUI displayed on the touch screen of the master electronic device 200. Accordingly, the one or more client electronic devices 202 may be identified based on the one or more names. Subsequently, one or more communication addresses corresponding to the one or more client electronic devices 202 may be determined. In an instance, the one or more communication addresses may be pre-determined. For instance, in case where each of the master electronic device 200 and the one or more client electronic device are connected to a common Wi-Fi network, the IP addresses of the one or more client electronic devices 202 may be available. Accordingly, the invitation to capture content may be transmitted to the one or more client electronic devices 202. In various embodiments, the invitation may be transmitted individually to each of the one or more client electronic devices 202 based on a communication address, such as, but not limited to, an IP address. Subsequently, based on the invitation, an invitation message may be presented on the one or more client electronic devices 202. For instance, the invitation message may include a personal note from the user to the one or more other users indicating the user's intent to capture content collaboratively. The personal note may also include information about the scene that the user intends to capture collaboratively. Accordingly, the one or more other users may view the invitation message and respond to the invitation. In an instance, two options may be presented on a presentation device, such as a display device, of a client electronic device of the one or more client electronic devices 202. The two options may include "accept-invite" and "reject-invite" displayed in the form of a GUI. Additionally, in an instance, the GUI may include an option to receive a personal note from the one or more other users.

Accordingly, in an instance, the one or more other users may respond to the invitation by providing the accept invite input at step 1106. In various embodiments, the response of the one or more other users to the invitation may be transmitted to the user operating the master electronic device 200. In an instance, a GUI presented on the master electronic device 200 may display responses received from the one or more other users. As a result, the user operating the master electronic device 200 may be aware about which of the one or more other users would participate in capturing content collaboratively.

Further, at step 1108, the master electronic device 200 may transmit the control-input to the one or more client electronic devices 202. In an instance, the one or more client electronic devices 202 may be operated by the one or more other users who have provided the accept-invite input. Accordingly, the control-input may be received by the one or more client electronic devices 202. Subsequently, at step 1110, based on the control-input, the one or more client electronic devices 202 may capture content. In an instance, the control-input may include the time value. For example, the time value may include the standard time as determined at the master electronic device 200 concurrent to transmitting the control-input. Accordingly, in various embodiments, upon receiving the control-input including the time value, the one or more client electronic devices 202 may synchronize corresponding client timing modules with the standard time corresponding to the master electronic device 200. In various embodiments, the standard time may be determined based on an output of the master timing module 302 included in the master electronic device 200. Accordingly, each of the client timing modules included in the one or more client electronic devices 202 may be synchronized with the master timing module 302. As a result, each of the master electronic device 200 and the one or more client electronic devices 202 may have a common time base. Further, in various embodiments, the control-input may include the indication of the one or more operations corresponding to content capture. For example, the one or more operations may include, but are not limited to, initiation of content capture, pausation of content capture, termination of content capture, transformation of content capture, storage of content capture and transmission of content capture. Furthermore, in various embodiments, the time value may include one or more time instants corresponding to the one or more operations. Each of the indication of the one or more operations and the one or more time instants may be specified by the user through, for example, a GUI displayed on the master electronic device 200. In various embodiments, each of the indication of the one or more operations and the one or more time instants may be transmitted to the one or more client electronic devices 202 collectively in a single communication message. For example, the user may decide to capture content beginning from a start time and lasting till an end time. Accordingly, the control-input may include information about the start-time and the end-time and an operation, such as, for example, to capture video.

Subsequently, at step 1110, the one or more client electronic devices 202 may capture content based on the control-input. For example, the one or more client electronic devices 202 may capture content starting from a start time till an end time. Each of the start time and the end time may be indicated by the time value. In various embodiments, each of the one or more client electronic devices 202 may be synchronized to the common time based, such as for example, the standard time corresponding to the master electronic device 200. Accordingly, the one or more client electronic devices 202 may capture content synchronously. For instance, each of a first video captured by a first client electronic device of the one or more client electronic devices 202 and a second video captured by a second client electronic device of the one or more client electronic devices 202 may correspond to a common set of time instants. Further, in another embodiment, each of the one or more client electronic devices 202 may capture content synchronously with the master electronic device 200. Accordingly, the master electronic device 200 may also capture content based on the control-input. For instance, the user operating the master electronic device 200 may initiate capture of content by providing the control-input. Accordingly, the master electronic device 200 may capture content based on the control-input. Further, the one or more client electronic devices 202 may also capture content based on the control-input. Subsequently, in various embodiments, when the user provides an indication of termination of content capture, each of the master electronic device 200 and the one or more client electronic devices 202 may terminate content capture. As a result, content may be captured collaboratively with the use of the master electronic device 200 and the one or more client electronic devices 202.

Thereafter, at step 1112, content captured by the one or more client electronic devices 202 may be transmitted to the master electronic device 200. In an instance, the content captured by the one or more client electronic devices 202 may be displayed on the touch screen of the master electronic device 200 at step 1114. Accordingly, the user operating the master electronic device 200 may be able to view content captured by the one or more client electronic devices 202. Additionally, in various embodiments, the content captured by the master electronic device 200 may also be displayed on the touch screen of the master electronic device 200. For instance, the touch screen display may be partitioned into a master display region and a client display region. Further, the content captured by the master electronic device 200 may be displayed within the master display region while the content captured by the one or more client electronic device may be displayed within the client display region. Additionally, in various embodiments, the client display region may be further partitioned into a plurality of client display regions. Accordingly, in an instance, content captured by two or more client electronic devices of the one or more client electronic devices 202 may be displayed in the plurality of client display regions. Consequently, the user operating the master electronic device 200 may be able to concurrently view content captured by each of the master electronic device 200 and the one or more client electronic devices 202.

While various embodiments of the disclosed methods and systems have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

IV. Computing Device Architecture

Platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods of FIG. 9-11 have been described to be performed by a computing device 100, it should be understood that, in some embodiments, different operations may be performed by different networked elements in operative communication with computing device 100.

Embodiments of the present disclosure may comprise a system having a memory storage and a processing unit. The processing unit coupled to the memory storage, wherein the processing unit is configured to perform the stages of methods of FIG. 9-11.

Figure 12:
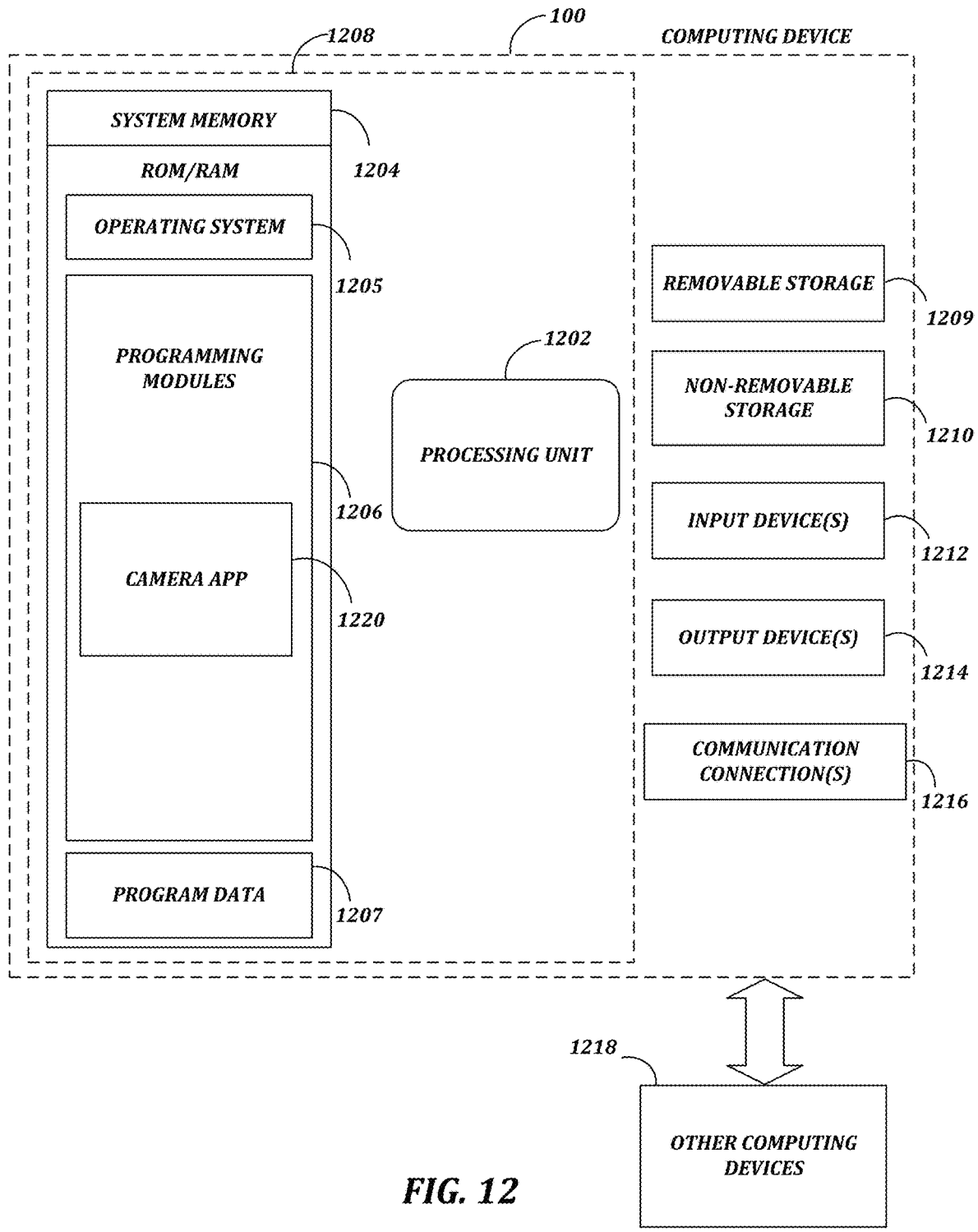
FIG. 12 is a block diagram of a system including a computing device for performing the methods of FIG. 9-11.

FIG. 12 is a block diagram of a system including computing device 100. Consistent with various embodiments of the disclosure, the aforementioned memory storage and processing unit may be implemented in a computing device, such as computing device 100 of FIG. 1. Any suitable combination of hardware, software, or firmware may be used to implement the memory storage and processing unit. For example, the memory storage and processing unit may be implemented with computing device 100 or any of other computing devices 1218, in combination with computing device 100. The aforementioned system, device, and processors are examples and other systems, devices, and processors may comprise the aforementioned memory storage and processing unit, consistent with embodiments of the disclosure.

With reference to FIG. 12, a system consistent with various embodiments of the disclosure may include a computing device, such as computing device 100. In a basic configuration, computing device 100 may include at least one processing unit 1202 and a system memory 1204. Depending on the configuration and type of computing device, system memory 1204 may comprise, but is not limited to, volatile (e.g. random access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 100's operation. In one embodiment, programming modules 1206 may include a camera app 1220. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 100 may have additional features or functionality. For example, computing device 100 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and nonvolatile, removable and non-removable media implemented in any method or technology for storage of information, such as computer readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 100. Any such computer storage media may be part of device 100. Computing device 100 may also have input device(s) 1212 such as a keyboard, a mouse, a pen, a sound input device, a touch input device, etc. Output device(s) 1214 such as a display, speakers, a printer, etc. may also be included. The aforementioned devices are examples and others may be used.

Computing device 100 may also contain a communication connection 1216 that may allow device 100 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., the camera app 1220) may perform processes including, for example, one or more stages of methods of FIG. 9-11 as described above. The aforementioned process is an example, and processing unit 1202 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A client electronic device configured to control capture of content, the client electronic device comprising:
    a communication module configured to communicate data between the client electronic device and a master electronic device,
    wherein a communication of the data comprises:
        reception, from the master electronic device, of an invitation to join a capture session,
        transmission, to the master electronic device, of an acceptance to the capture session, the acceptance comprising device parameters associated with the client electronic device,
        reception of a control-input from the master electronic device at the client electronic device, the control-input comprising a plurality of rules for triggering, pausing, and terminating a capture of content as specified by the master electronic device,
        transmission, to the client electronic device, of an indication that the client electronic device is being utilized for the capture of content, and
        transmission of the content captured to the master electronic device;
    a means to capture the content in response to the control-input,
        wherein the client electronic device is configured to initiate a capture of the content in response to at least one rule of the plurality of rules associated with the control-input, the at least one rule being associated with:
            at least one of a plurality of objects, specified by the master electronic device, which, when detected within a field of view of the means to capture the content, is employed to initiate a signal to the client electronic device to capture the content; and
    a processing module configured to:
        detect at least one object within the field of view of the means to capture the content, the at least one object associated with the plurality of rules specified by the master electronic device,
        trigger, in response to a detection, the content capture, and
        transmit the captured content to the master electronic device, the master electronic device being configured to display a first frame of the content capture session comprising the at least one object in the field of view of a first client device simultaneously with a second frame of the content capture session comprising the at least one object in the field of view of a second client device.

2. The client electronic device of claim 1, wherein the control-input further comprises a time value configured to synchronize a timing of content capture between the master electronic device and the client electronic device.

3. The client electronic device of claim 2, wherein the control-input comprises indication of at least one operation, wherein the client electronic device is configured to perform the at least one operation at a time indicated in the time value.

4. The client electronic device of claim 2, wherein each of the client electronic device and the master electronic device is configured to capture content synchronously in response to the control-input.

5. The client electronic device of claim 1, wherein the wireless transmission and reception is over at least one of the following: a common local-area-network connection, a Wi-Fi connection, and a Bluetooth connection.

6. The client electronic device of claim 1, wherein the communication further comprises wireless reception of the content captured by the master electronic device.

7. A method of controlling a capture of content by a client electronic device via a master electronic device, the method comprising:
    initiating a content capture session;
    transmitting an invitation to the content capture session to at least one client electronic device;
    receiving an acceptance to the invitation from the at least one client electronic device;
    receiving a specification of a region of interest within at least one of a field of view of the master electronic device;
    defining at least one rule for triggering, pausing, and terminating the capture of content based on the region of interest;
    transmitting control-input from the master electronic device to the at least one client electronic device with at least one rule;
    triggering the capture of the content when the region of interest is detected within a field of view of the at least one client device; and
    transmitting, to the client electronic device, an indication that the client device is being utilized for the capture of content.

8. The method of claim 7, wherein receiving the specification of the region of interest comprises receiving a specification of the object.

9. The method of claim 8, further comprising:
    initiating the content capture session, the content capture session comprising:
        a display of content within the field of view of the master electronic device, and
        a display of content within the field of view of the at least one client electronic device.

10. The method of claim 9, further comprising:
    displaying, on the master electronic device, a frame corresponding to the content captured by a first client electronic device.

11. The method of claim 10, further comprising:
    updating the frame with content captured by a second client electronic device when the object transitions from the field of view associated with the first client electronic device to a field of view associated with the second electronic device.

* * * * *